United States Patent
Shao et al.

(10) Patent No.: US 8,199,355 B2
(45) Date of Patent: Jun. 12, 2012

(54) DOCUMENT MANAGEMENT SOFTWARE, PRINT CONTROL DEVICE, AND DOCUMENT MANAGEMENT METHOD OF PRINT CONTROL DEVICE

(75) Inventors: Yuan Shao, Sutton (GB); Perasiriyan Sivakumaran, Dunstable (GB); Gabriella Semple, Woodley (GB); Kenji Takahashi, Ealing (GB)

(73) Assignee: Canon Europa NV, Amstelveen (NL)

( * ) Notice: Subject to any disclaimer, the term of this patent is extended or adjusted under 35 U.S.C. 154(b) by 1132 days.

(21) Appl. No.: 11/360,563

(22) Filed: Feb. 24, 2006

(65) Prior Publication Data
US 2006/0232814 A1 Oct. 19, 2006

(30) Foreign Application Priority Data
Feb. 25, 2005 (GB) .................................. 0503975.5

(51) Int. Cl.
| G06K 15/00 | (2006.01) |
| H04N 1/00 | (2006.01) |
| H04N 1/46 | (2006.01) |
| G09G 5/39 | (2006.01) |
| G09G 5/00 | (2006.01) |
| G06F 13/28 | (2006.01) |
| G06F 13/00 | (2006.01) |

(52) U.S. Cl. ...................... 358/1.16; 358/1.15; 358/1.18; 358/501; 358/448; 345/619; 345/531; 345/533; 345/536

(58) Field of Classification Search .................. 358/1.15, 358/1.14
See application file for complete search history.

(56) References Cited

U.S. PATENT DOCUMENTS

| 5,713,032 | A | * | 1/1998 | Spencer ......................... 715/209 |
| 5,761,328 | A | * | 6/1998 | Solberg et al. ................. 382/113 |
| 5,797,139 | A | * | 8/1998 | Amro .................................... 1/1 |
| 6,006,281 | A | * | 12/1999 | Edmunds ......................... 710/1 |
| 6,011,905 | A | * | 1/2000 | Huttenlocher et al. ........ 358/1.2 |
| 6,044,384 | A | * | 3/2000 | Ishima et al. .................. 715/210 |
| 6,052,198 | A | * | 4/2000 | Neuhard et al. ............. 358/1.15 |
| 6,067,553 | A | * | 5/2000 | Downs et al. .................. 715/206 |
| 6,133,914 | A | | 10/2000 | Rogers et al. |
| 6,202,092 | B1 | * | 3/2001 | Takimoto ...................... 709/225 |
| 6,205,287 | B1 | | 3/2001 | Takahashi et al. |
| 6,388,757 | B1 | * | 5/2002 | Koga ........................... 358/1.11 |
| 6,501,485 | B1 | * | 12/2002 | Dash et al. .................... 715/700 |
| 6,538,760 | B1 | * | 3/2003 | deBry et al. ................. 358/1.15 |
| 6,995,860 | B2 | * | 2/2006 | Roztocil et al. ............. 358/1.18 |
| 7,057,770 | B2 | * | 6/2006 | Case ............................. 358/1.9 |
| 7,061,645 | B2 | * | 6/2006 | Chang ........................... 358/1.9 |

(Continued)

FOREIGN PATENT DOCUMENTS
EP 0 249 399 12/1987
(Continued)

*Primary Examiner* — Hilina S Kassa
(74) *Attorney, Agent, or Firm* — Fitzpatrick, Cella, Harper & Scinto (57) ABSTRACT

A document management software is executed in print control device connectable via a network to an information processing device that sends an instruction and document thereto. The software includes: a step of determining if a non-native document is selected, wherein the non-native document is stored in a detachable memory connected to the print control device; a step of sending to the information processing device the selected non-native document so as to convert the non-native document into a native document; and a step of receiving the converted native document from the information processing device for printing, wherein the native document is printable document.

18 Claims, 9 Drawing Sheets

U.S. PATENT DOCUMENTS

| | | | |
|---|---|---|---|
| 7,072,061 B2 * | 7/2006 | Blair et al. | 358/1.15 |
| 7,139,102 B2 * | 11/2006 | Minato | 358/3.07 |
| 7,180,616 B2 * | 2/2007 | Miyoshi et al. | 358/1.15 |
| 7,256,906 B2 * | 8/2007 | Nakajima | 358/1.15 |
| 7,359,084 B2 * | 4/2008 | Nara et al. | 358/1.18 |
| 7,423,776 B2 * | 9/2008 | Murata | 358/1.16 |
| 7,430,544 B2 * | 9/2008 | Kasubuchi | 705/400 |
| 7,440,134 B2 * | 10/2008 | Natori | 358/1.9 |
| 7,495,808 B2 * | 2/2009 | Sasakuma et al. | 358/474 |
| 7,535,477 B2 * | 5/2009 | Zaima et al. | 345/619 |
| 7,551,313 B2 * | 6/2009 | Kuroki | 358/1.2 |
| 7,573,594 B2 * | 8/2009 | Leslie et al. | 358/1.15 |
| 7,843,594 B2 * | 11/2010 | Ferlitsch | 358/1.16 |
| 2002/0062404 A1 * | 5/2002 | Ecob et al. | 709/321 |
| 2002/0112114 A1 * | 8/2002 | Blair et al. | 711/100 |
| 2002/0186253 A1 | 12/2002 | Rodden et al. | |
| 2002/0194404 A1 * | 12/2002 | Anderson et al. | 710/72 |
| 2003/0086098 A1 * | 5/2003 | Sesek et al. | 358/1.1 |
| 2003/0184806 A1 * | 10/2003 | Nara et al. | 358/1.18 |
| 2004/0041913 A1 * | 3/2004 | Takasumi et al. | 348/207.2 |
| 2004/0059995 A1 * | 3/2004 | Takabayashi et al. | 715/500 |
| 2006/0085567 A1 * | 4/2006 | Takada et al. | 710/15 |
| 2006/0203255 A1 | 9/2006 | Takaragi et al. | |
| 2006/0209337 A1 | 9/2006 | Atobe et al. | |
| 2006/0226218 A1 | 10/2006 | Atobe et al. | |
| 2007/0211281 A1 * | 9/2007 | Nishimura | 358/1.15 |
| 2007/0255949 A1 * | 11/2007 | Miyazaki et al. | 713/165 |
| 2007/0279689 A1 * | 12/2007 | Aoki et al. | 358/1.16 |
| 2008/0030780 A1 * | 2/2008 | Izawa | 358/1.16 |

FOREIGN PATENT DOCUMENTS

| | | |
|---|---|---|
| EP | 0 537 097 | 4/1993 |
| EP | 0950969 | 10/1999 |
| EP | 1 267 254 A2 | 12/2001 |
| EP | 1 174 787 | 1/2002 |
| EP | 1267254 A2 * | 12/2002 |
| EP | 1300753 | 4/2003 |
| EP | 1 460 820 A1 | 9/2004 |

* cited by examiner

DOCUMENT MANAGEMENT SOFTWARE, PRINT CONTROL DEVICE, AND DOCUMENT MANAGEMENT METHOD OF PRINT CONTROL DEVICE

BACKGROUND OF THE INVENTION

1. Field of the Invention

The present invention relates to a print control device connectable via a network to an information processing device that sends an instruction and document thereto and the information processing device connectable via the network to the print control device that receives an instruction and document therefrom.

2. Description of the Related Art

Many varieties of memory devices are sold in the world, such as USB (Universal Serial Bus) memory, SD (Secure Digital) card and CF (Compact Flash) card etc. A user of a USB memory device can carry it with a huge amount of data freely like a tote bag and connect it to personal computers in an office and home. For enhanced security of the memory device, recently a USB memory device having a fingerprint authentication system has been sold. There are two types of the USB memory device for the specialized market. The first type of the USB memory device obtains a fingerprint of the user using a sensor on the memory device and sends information related to the obtained fingerprint to application software installed into the personal computers in order to register the fingerprint information in the personal computers for the fingerprint authentication. After registering it in a personal computer, when the USB memory device is connected to that computer and sends to it new fingerprint information obtained by the sensor, the personal computer (PC) executes the application software in order to determine if the new fingerprint information corresponds with the registered fingerprint information for the fingerprint authentication.

The second type of USB memory device has a microprocessor and application software for the fingerprint authentication therein. The second type of USB memory device obtains a fingerprint of the user using a sensor on the memory device and registers the fingerprint information therein. After registering it in the USB memory device, when the USB memory device is connected to a personal computer, the microprocessor executes the application software in order to determine if the new fingerprint information obtained by the sensor corresponds with the registered fingerprint information for the fingerprint authentication. The second type of USB memory device has higher security than the first type of USB memory device, since the second type of USB memory device does not send the fingerprint information outside of the device and sends only a result of the fingerprint authentication to the personal computer.

Recently it has been necessary to connect the USB memory device to an MFP (Multi Function Peripheral) in order to print documents stored in the USB memory device or store scanned documents into the USB memory device. Generally an MFP is shared in an office and used to process many confidential items of information.

However, in this situation, in a case where the USB memory device stores a non-native document (a non-printable format document) and is connected to the MFP, the MFP cannot interpret it and print it, since the non-native document has a format that the MFP is not able to interpret. The non-native document can be interpreted by appropriate applications, but it cannot be interpreted in the MFP. Further, if the USB memory device storing both a non-native document and a native document is connected to the MFP, a user of the MFP cannot see which document is a non-native document on an operation panel of the MFP. Also, in a case where the SD card or CF card (memory) storing the non-native document is connected to a digital camera, the digital camera cannot display information related to the non-native document on an operation panel of the digital camera, since the digital camera does not recognize it. The user of the digital camera can see only information (icon or thumbnail, etc.) related to a native document like image data.

SUMMARY OF THE INVENTION

The present invention has been made in order to solve at least one of the problems described above. According to an aspect of the present invention, there is a document management software to be executed in print control device connectable via a network to an information processing device that sends an instruction and document thereto. The software includes: a step of determining if a non-native document is selected, wherein the non-native document is stored in a detachable memory connected to the print control device; a step of sending to the information processing device the selected non-native document so as to convert the non-native document into a native document; and a step of receiving the converted native document from the information processing device for printing, wherein the native document is printable document.

According to another aspect of the present invention, there is a document management software to be executed in print control device connectable via a network to an information processing device that sends an instruction and document thereto. The software includes: a step of detecting a non-native document stored in a detachable memory connected to the print control device; and a step of displaying respective information related to the detected non-native document and a native document on a display of the print control device so as to discriminate between the non-native document and the native document, wherein the native document is printable document.

According to another aspect of the present invention, there is a print control device connectable via a network to an information processing device that sends an instruction and document thereto, the print control device includes a controller for determining if a non-native document is selected, wherein the non-native document is stored in a detachable memory connected to the print control device, sending to the information processing device the selected non-native document so as to convert the non-native document into a native document and receiving the converted native document from the information processing device for printing, wherein the native document is printable document.

According to another aspect of the present invention, there is a print control device connectable via a network to an information processing device that sends an instruction and document thereto, the print control device includes a controller for detecting a non-native document stored in a detachable memory connected to the print control device and for displaying respective information indicating the detected non-native document and a native document on a display of the print control device so as to discriminate between the non-native document and the native document, wherein the native document is printable document.

Other features and advantages of the present invention will be apparent from the following description taken in conjunc-

DETAILED DESCRIPTION OF THE EMBODIMENTS

A document management software, a document management method and a print control device according to the present embodiment enable printing of a non-native document in a MFP and displaying respective information related to a non-native document and a native document on a display of the print control device so as to discriminate between the non-native document and the native document.

Figure 1:
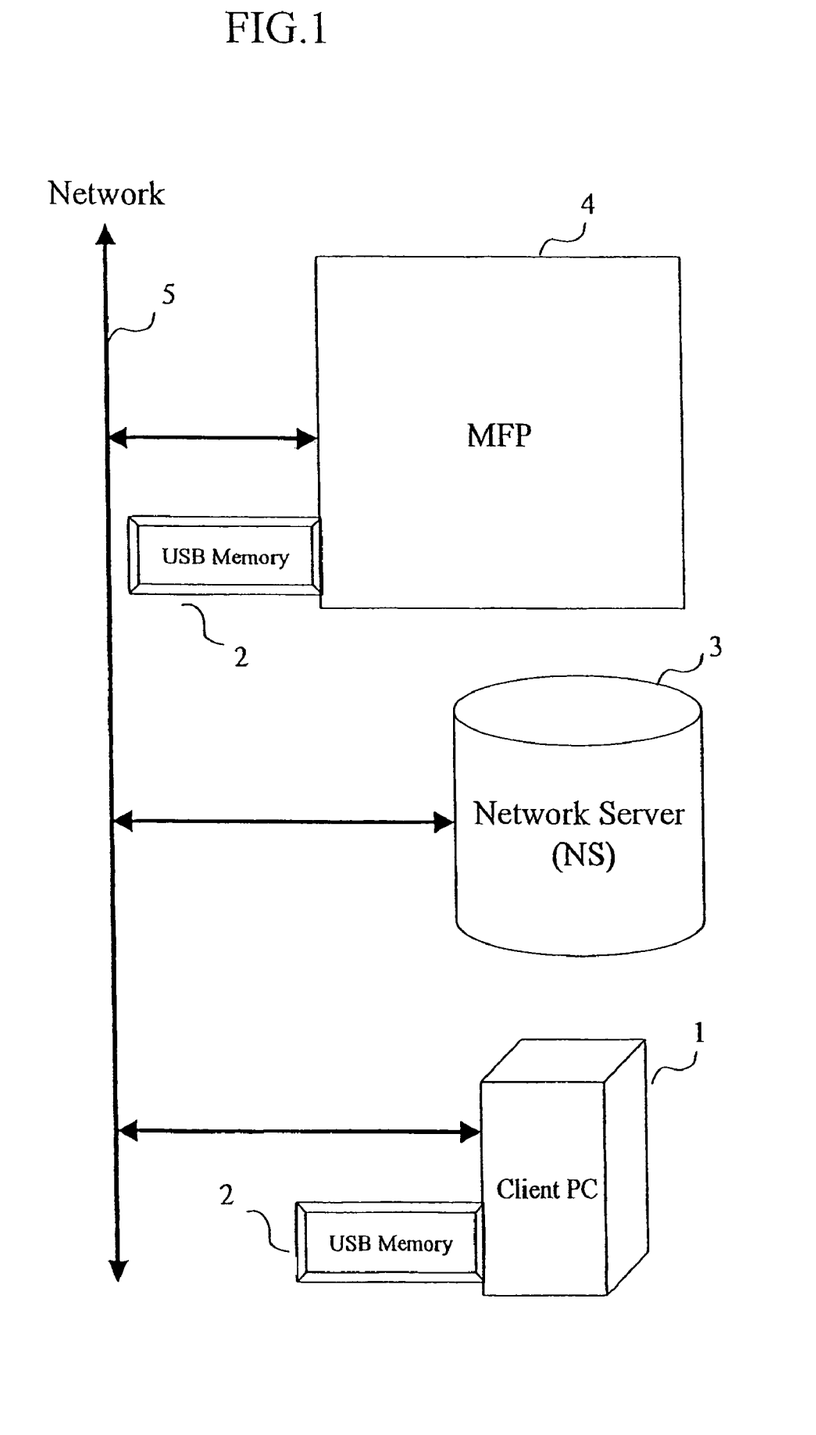
FIG. 1 illustrates relationship between the information processing devices (client PC and Network server) and print control device (MFP) on the network according to an embodiment of the present invention.

In the following, a detailed description will be given of embodiments of the present invention with reference to the accompanied drawings. FIG. 1 illustrates relationship between the information processing devices (personal computers like Client PC 1 and NS 3) and print control device (MFP) on the network according to an embodiment of the present invention. In FIG. 1, reference numeral 1 denotes a Client Personal Computer (information processing device) and includes at least one USB connector to connect a USB memory device 2. Also, reference numeral 3 denotes Network Server (information processing device) and includes at least one document convert software to convert a non-native document to a native document and send the converted document to MFP 4 via a network 5. The USB memory device 2 stores a non-native document and/or a native document. The native document is printable document in MFP 4 and the non-native document is not printable document in MFP. MFP 4 has platform software not shown in this embodiment and executes application software not shown in this embodiment based on the platform software. In order to print the non-native document in MFP 4 by using the application software, it is necessary to convert the non-native document to the native document in NS 3. The non-native document depends on OS (operation software) of personal computers (Client PC 1 and Network Server 3).

The non-native document is converted into a native document comprising a page description language (PDL) to be interpreted in MFP 4. The native document is interpreted by interpreter software in MFP 4 not shown in this embodiment and is converted into image data to be printed by MFP 4. Also, the non-native document is converted into a native document comprising a document format to be interpreted in MFP 4. The native document is interpreted by interpreter software in MFP 4 not shown in this embodiment and is converted into image data to be printed by MFP 4. The non-native document may be converted into image data directly in NS 3. And the converted image data may be encrypted in NS 3 and sent to MFP 4. The encrypted image data may be decrypted in MFP 4 and printed by MFP 4. The non-native document is converted into the native document by conversion software stored in NS 3.

Figure 2:
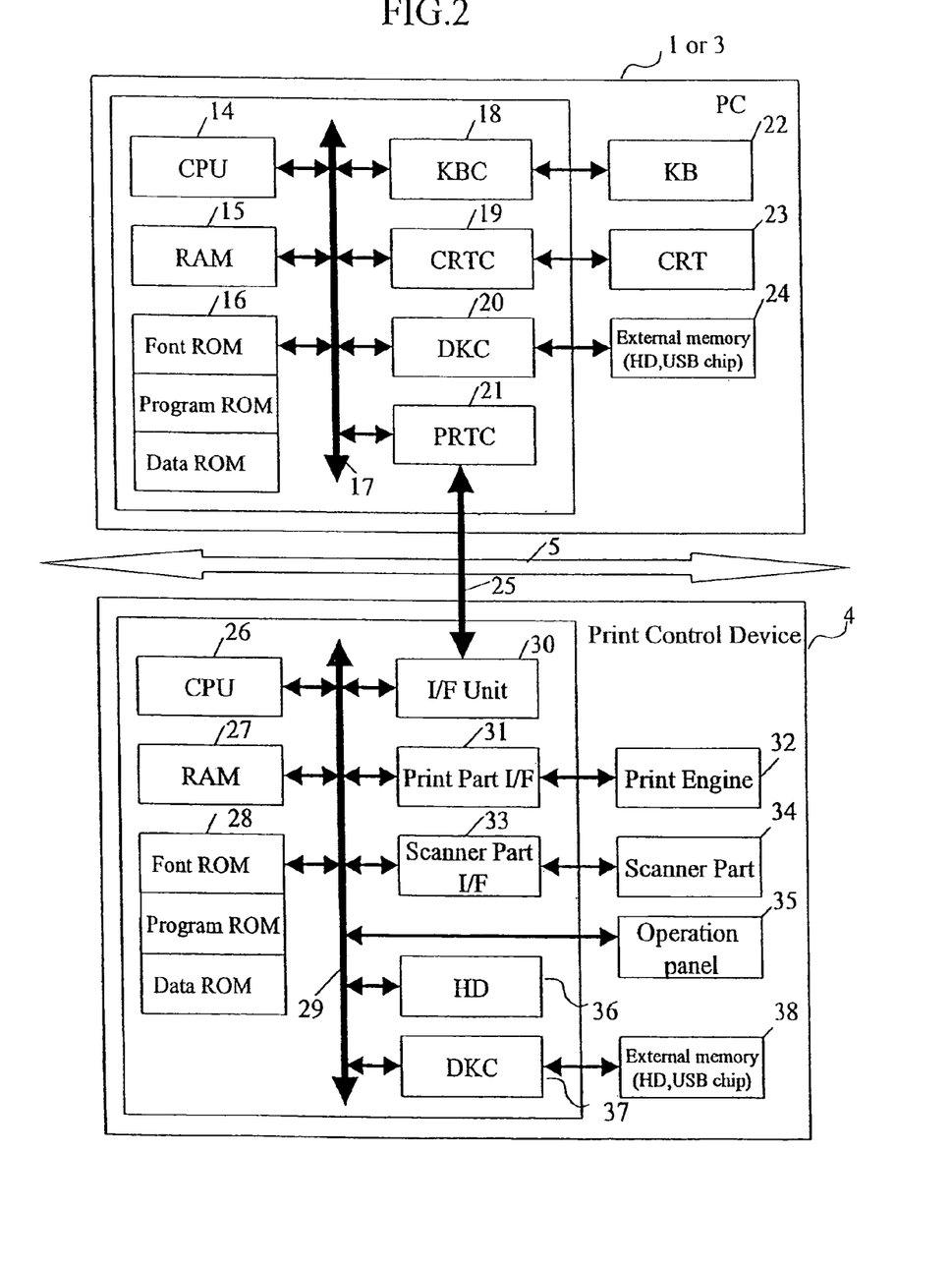
FIG. 2 is a block diagram illustrating a schematic configuration of a document management system including one of the information processing devices according to an embodiment of the present invention.

FIG. 2 is a block diagram illustrating a schematic configuration of a memory management system including one of the information processing devices according to an embodiment of the present invention. In this regard, although a memory management system is shown as an embodiment, the present invention is not limited to this. The present invention is applied to a network system in which processing is performed by connecting through a network such as a LAN (local area network), WAN (wide area network), etc., as long as it is an environment in which the memory management software can be executed.

In FIG. 2, reference numeral 1 denotes one of personal computers (Client PC 1 and NS 3) shown in FIG. 1, and includes a CPU (central processing unit) 14 which executes processing on documents including a combination of graphics, images, characters, tables (including spreadsheets), etc., based on a document processing program, etc., stored in a program ROM of a ROM (read only memory) 16 or an external memory 24 (HD, USB chip and so on). The CPU 14 integrally controls each of the devices connected to a system bus 17. Also, the program ROM of the ROM 16 or the external memory 24 stores an operating system (OS), which is the control program of the CPU 14 and the conversion software, etc., a font ROM of the ROM 16 or the external memory 24 stores font data, etc., to be used for the document processing described above, and a data ROM of the ROM 16 or the external memory 24 stores various data to be used for the above-described document processing and the conversion software, etc. Reference numeral 15 denotes a RAM (random access memory), and functions as a main memory, a work area, etc., of the CPU 14.

Reference numeral 18 is a keyboard controller (KBC), and controls the input from a keyboard 22 and an unillustrated pointing device. Reference numeral 19 is a CRT controller (CRTC), and controls the display of a CRT (cathode ray tube) display 23. Reference numeral 20 is a disk controller (DKC), and controls the access to and from the external memory 24 such as a hard disk (HD), a USB memory device, etc., which store a boot program, various applications including the conversion software to convert the non-native document into the native document, font data, user files, etc.

Reference numeral 21 is a print controller (PRTC), which is connected to a print control device (MFP) 4 through a predetermined bi-directional interface (interface) 25 via the network 5, and executes communication control processing with print control device 4. In this regard, CPU 26 executes, for example, outline-font expansion (rasterization) processing into a display information RAM, which is set in RAM 27, and provides WYSIWYG (what you see is what you get) on CRT 23. Also, CPU 26 opens various registered windows, and executes various data processing based on the commands instructed by an unillustrated mouse cursor, etc., on CRT 23.

In print control device 4, reference numeral 26 is a CPU. CPU 26 outputs an image signal as output information to a print part (printer engine) 32 connected to a system bus 29 based on the control program, etc., stored in a program ROM of a ROM 28 or the control program, etc., stored in HD 36. Also, the program ROM of the ROM 28 stores a control program, etc., of the CPU 26. A font ROM of the ROM 28 stores font data, etc., to be used when the above-described output information is created. A data ROM of the ROM 28 stores information, etc., to be used in Client PC 1 when the print control device 4 does not have a hard disk (HD) 36, etc.

CPU 26 is capable of performing communication processing with Client PC 1 and/or NS 3 through an I/F unit 30. Reference numeral 27 is a RAM which functions as a main memory, a work area, etc., of CPU 26, and the memory capacity thereof can be expanded by an optional RAM connected to an unillustrated expansion port. In this regard, the RAM 27 is used for an output information expansion area, environment data storage area, an NVRAM (Non-Volatile RAM), etc.

Figure 3:
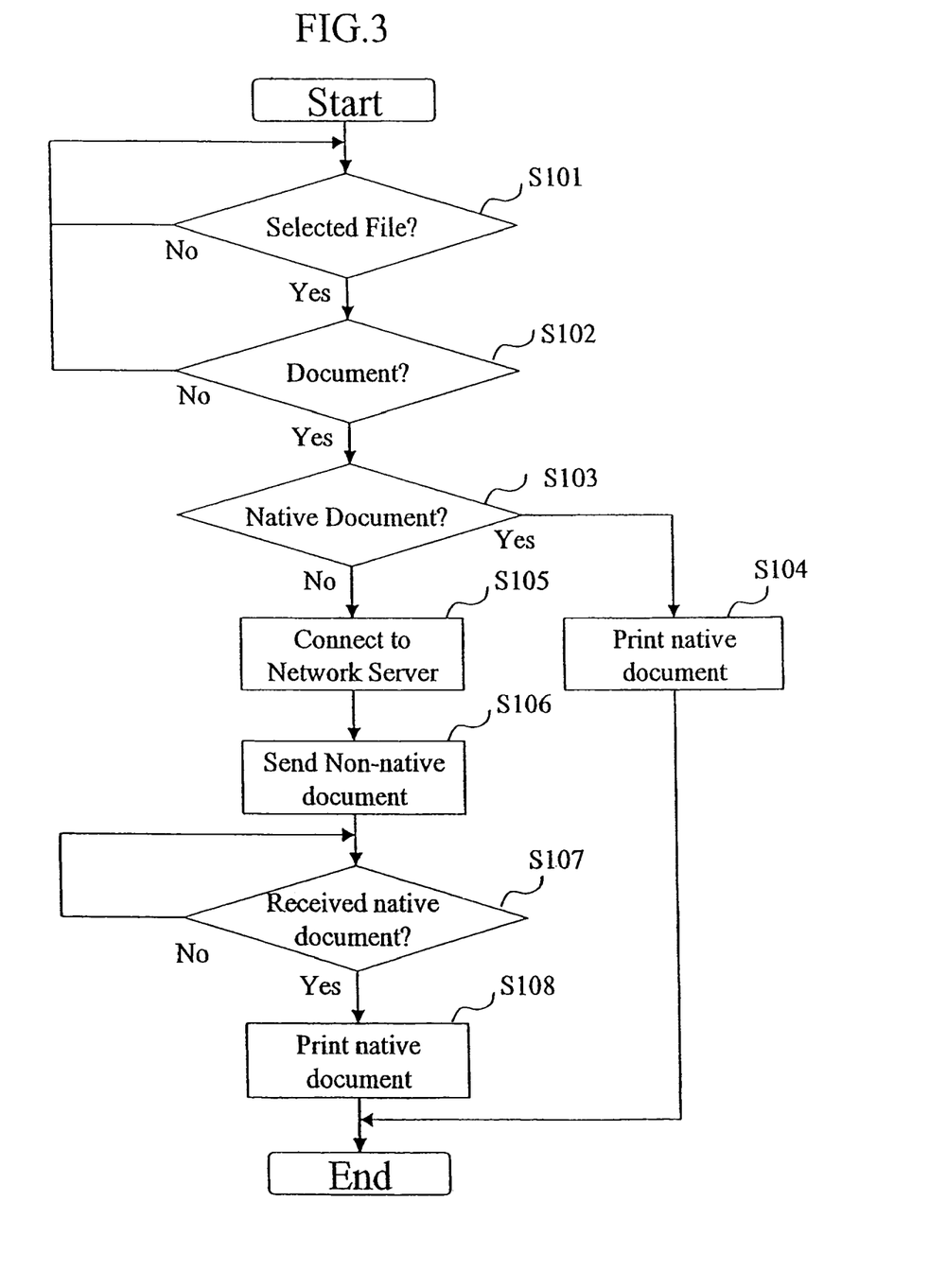
FIG. 3 is a flowchart illustrating a printing process of the document management system to be executed in the MFP.
Figure 4:
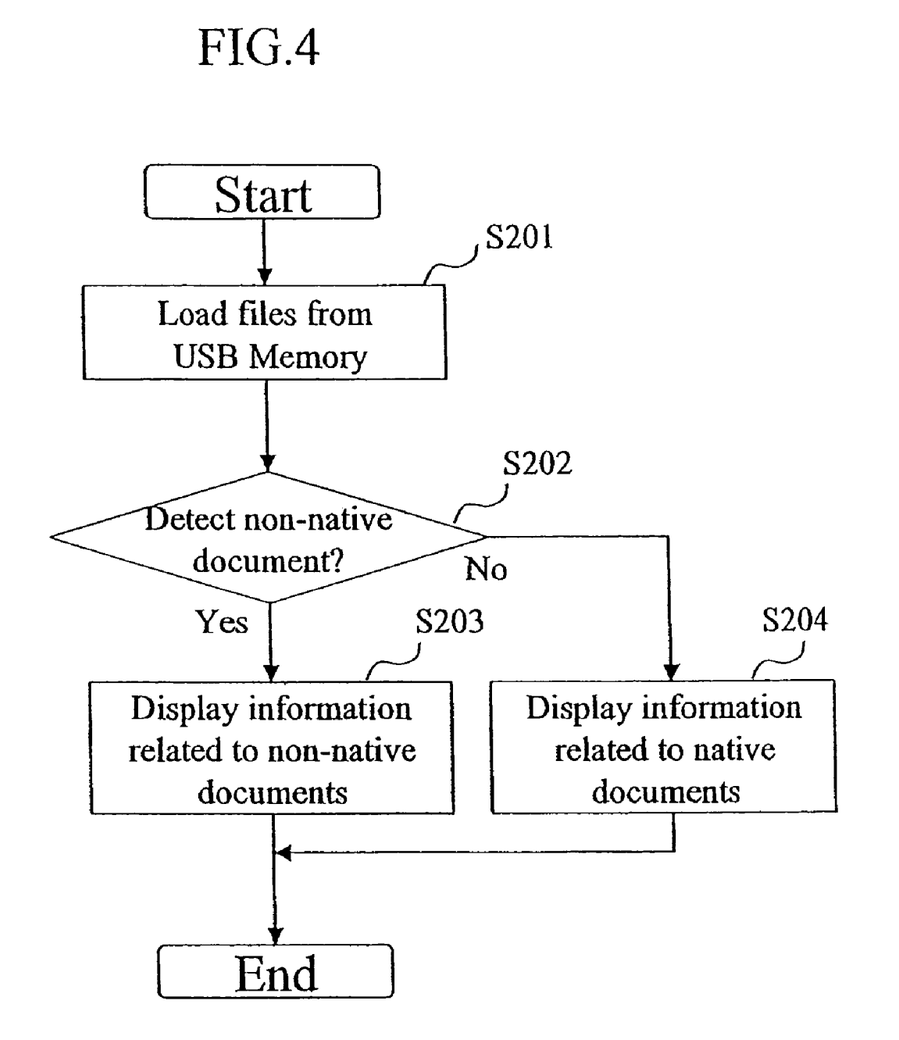
FIG. 4 is a flowchart illustrating a display process of the document management system to be executed in the MFP.

HD 36 stores font data, an emulation program, form data, memory management software shown in FIG. 3 and FIG. 4, information related to operation windows shown in FIG. 4 to FIG. 9., etc. Reference numeral 33 is a scanner part I/F and controls documents scanned by scanner part 34 (scanner engine). The scanned document may be printed by print engine 32 and sent to Client PC 1 by using a telephone line in a facsimile mode of print control device 4. The scanned document is stored into external memory 38 like USB memory device 2. If a user select documents stored in USB memory device 2, the documents are printed by print engine 32. Also, reference numeral 35 is an operation panel (part) to select documents to be printed or to be stored into USB memory device 2. Reference numeral 37 is a disk controller (DKC), and controls the access to and from the external memory 38 such as a hard disk (HD), a USB memory device 2, etc., which store a boot program, various applications, memory management software shown in FIG. 3 and FIG. 4, font data, user files, etc.

Figure 5:
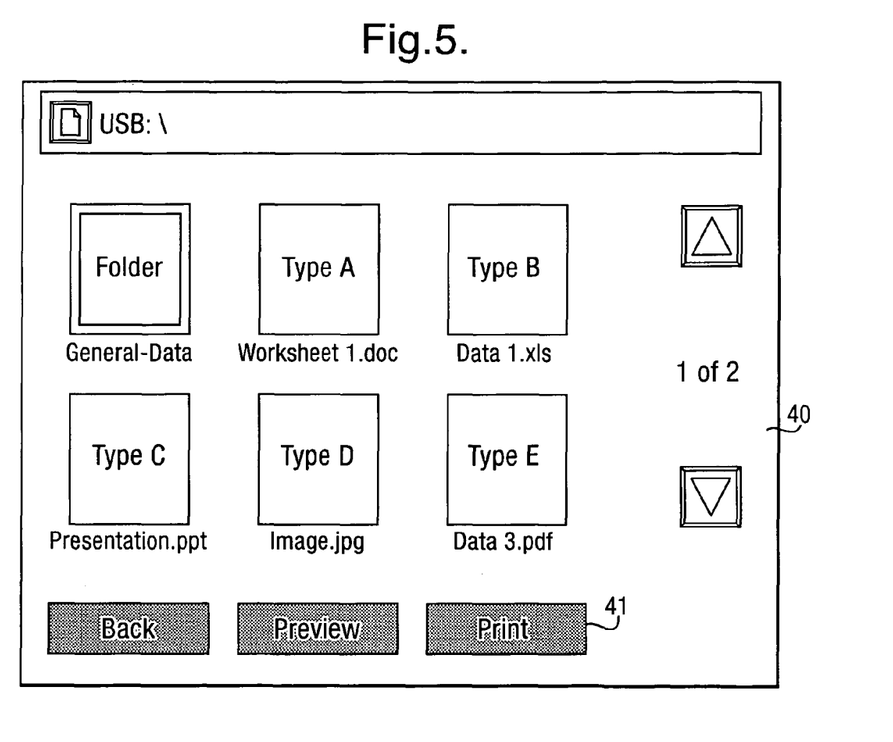
FIG. 5 is a diagram showing an operation window to be displayed on an operation panel of the MFP.

FIG. 3 is a flowchart illustrating a printing process of the document management system to be executed in NS 3 (information processing device). If a user connects external memory device 38 like a USB memory device 2 to MFP 4, the document management software shown in FIG. 3 is executed in MFP 4 and window 40 of FIG. 5 is displayed on operation panel 35. And then CPU 26 in MFP 4 determines if file in memory device 2 is selected for printing in step 101. If Yes in step 101, CPU 26 determines if the selected file is a document in step 102. If No in step 102, CPU 26 informs a user that the selected file is program file and not available for printing on operation panel 35 of MFP 4 returns to step 101. If Yes in step 102, CPU 26 determines if the selected document is native document like documents of type D and type E shown in FIG. 5 in step 103. If Yes in step 103, CPU 26 prints the native document by using print engine 32. If No in step 103, CPU 26 displays a message 50 of FIG. 9 on operation panel 35. The message is "the selected document is not available in MFP. Do you want to convert it to available format for printing?" If the user select icon 51 of "YES" on operation panel 35, CPU 26 establishes a connection with NS 3 via network 5 in step 105 and sends to NS 3 the non-native document like documents of type A, B and C shown in FIG. 5 in step 106. If NS 3 cannot convert the documents to the native documents after they have been sent to NS 3 in step 106, CPU 26 establishes a connection with another NS (not shown) via network 5 in step 105 based on a type of a document conversion software, and automatically sends the documents to the other NS in step 106. A user may select a desirable NS on a GUI displayed on the operation panel 35. NS 3 receives the non-native document from MFP 4 and converts it to the native document by using the conversion software. And then the converted native document is sent to MFP 4. CPU 26 determines if MFP 4 received the converted native document from NS 3 in step 107. If Yes in step 107, CPU 26 prints it by using print engine 32 in step 108.

Figure 6:
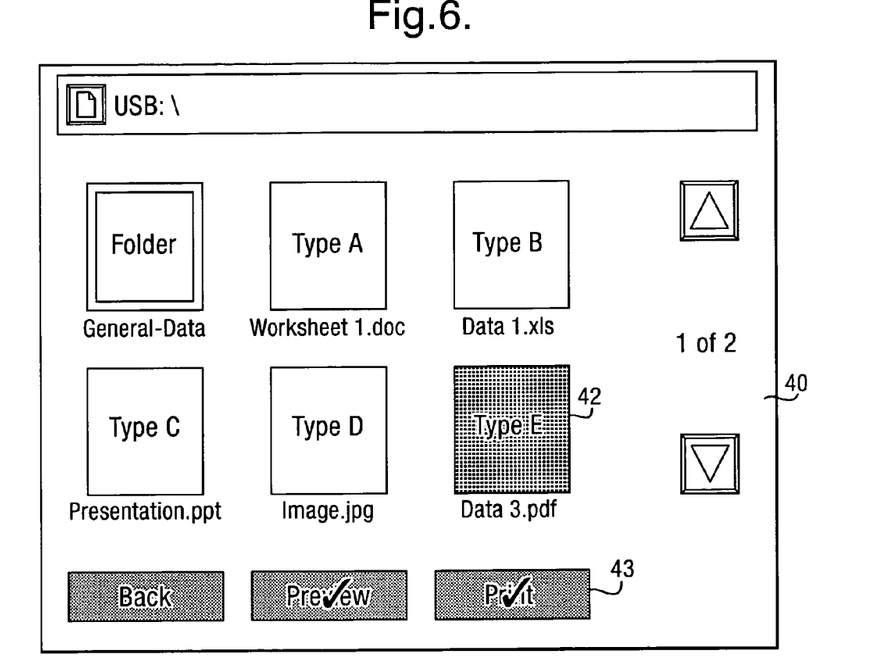
FIG. 6 is a diagram showing an another operation window to be displayed on an operation panel of the MFP.
Figure 7:
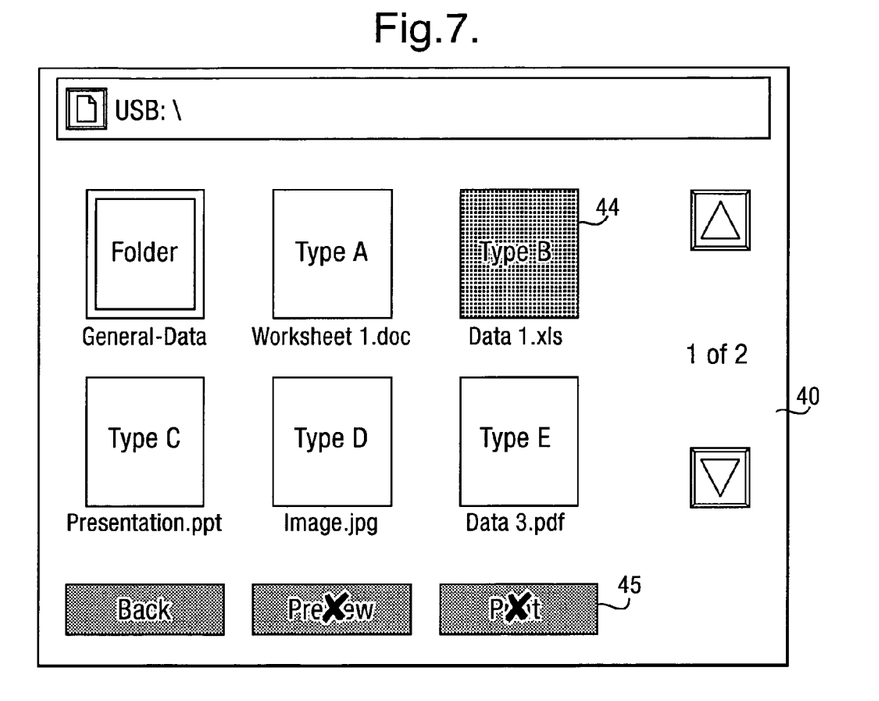
FIG. 7 is a diagram showing an another operation window to be displayed on an operation panel of the MFP.

FIG. 4 is a flowchart illustrating a display process of document management system to be executed in MFP 6. The display process shown in FIG. 4 is a part of the printing process shown in FIG. 3. According to the printing process in FIG. 3, after selecting the document, the user can recognize that the selected document is the non-native document or the native document. The display process of FIG. 4 is to inform the user which document is non-native document before selecting the non-native document. If the user connects USB memory device 2 into MFP 4, CPU 26 loads files from it and stores them in RAM 27 in step 201. CPU 26 determines if non-native document is selected on operation panel 35 in step 202. If No in step 202, CPU 26 displays information related to the native document on operation panel shown in FIG. 6. The information is visual feedback such as the mark 43 on icons shown in FIG. 6 and indicates that the selected document is printable in MFP 4. And then CPU 26 returns to step 104 of FIG. 3. If Yes in step 202, CPU 26 displays information related to the non-native document on operation panel shown in FIG. 7. The information is visual feedback such as the mark 45 on icons shown in FIG. 7 and indicates that the selected document is not printable in MFP 4. And then CPU 26 displays the message 50 of FIG. 9 on operation panel 35 and returns to step 105 of FIG. 3.

Figure 8:
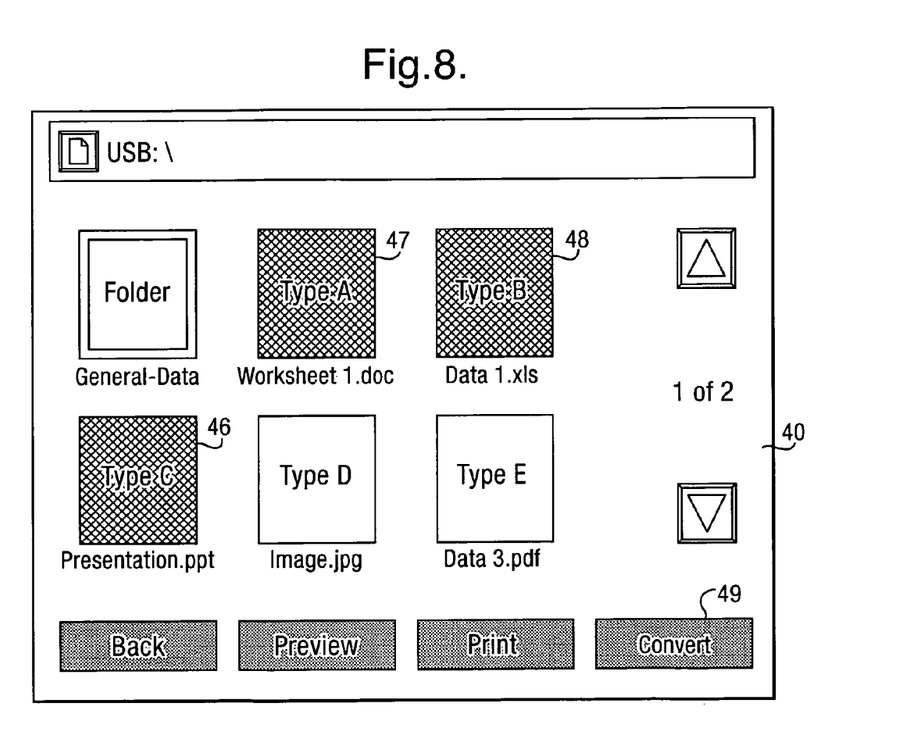
FIG. 8 is a diagram showing an another operation window to be displayed on an operation panel of the MFP.
Figure 9:
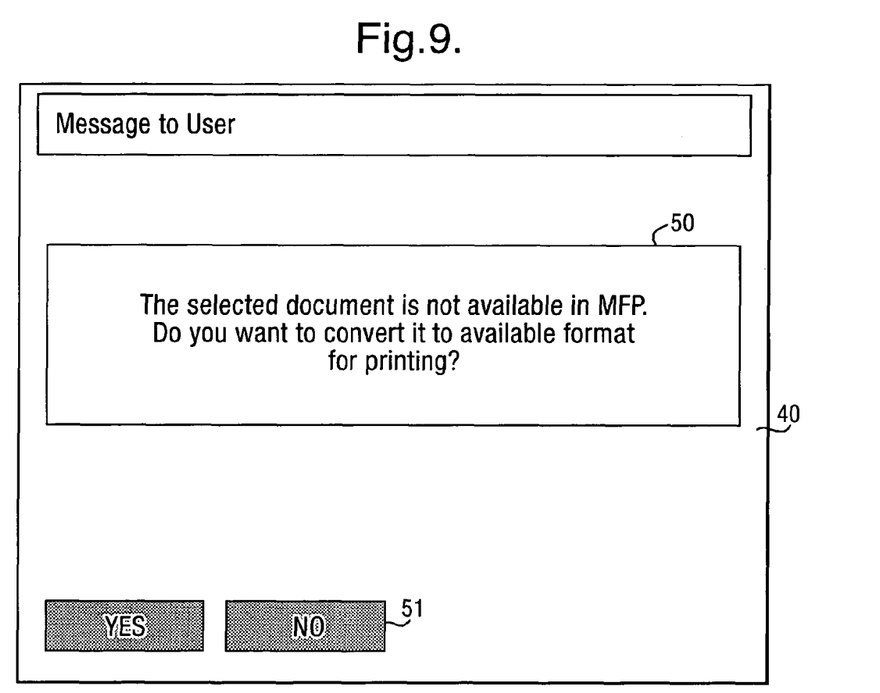
FIG. 9 is a diagram showing a message window to be displayed on an operation panel of the MFP.

In step 202 of FIG. 4, before the user selects the non-native document or the native document, CPU 26 may detect that the non-native document is stored in USB memory device 2 and display information related to the detected non-native document on operation panel 35. The information is visual feedback such as the fill effect of icons 46 to 48 shown in FIG. 8 and indicates that the detected non-native document is not printable in MFP 4. And then if the user selects the native document (like document of type D or type E), CPU 26 returns to step 104 to print it. If the user selects the non-native document (like document Type A to C), CPU 26 displays the message 50 of FIG. 9 on operation panel 35 and returns to step 105 of FIG. 3. The above mentioned information is displayed on operation panel 35 like windows shown in FIG. 6 to 8 so as to discriminate between the non-native document and the native document.

Also, in the above-described embodiment, various functions are achieved by reading the programs for achieving the functions in Client PC 1, NS 3 or MFP 4 into the memory (RAM) and the CPU executing these functions. However, the invention is not limited to this, and all of the processing or part of the functions may be achieved by dedicated hardware. Also, the above-described memory may be constituted by a non-volatile memory such as a magnetic optical disk unit, a flash memory, etc., a read-only recording medium such as a CD-ROM, etc., a volatile memory other than a RAM, or a computer-readable and writable recording medium by the combination of these.

Also, a program for achieving various processing functions in Client PC 1, NS 3, MFP 4 may be recorded into a computer-readable recording medium, and the program code recorded in the recording medium may be read into a computer system, and each processing may be performed by executing the program code. In this regard, a "computer system" mentioned here includes an OS, hardware such as a peripheral device, etc.

Also, a "computer-readable recording medium" means a portable medium such as a flexible disk, a magnetic optical disk, a ROM, a CD-ROM, etc., and a storage device such as a hard disk contained in a computer system. Furthermore, a "computer-readable recording medium" includes a device for holding a program for a certain period of time such as an internal volatile memory (RAM) of a computer system to be a server or a client when the program is transmitted through a network such as the Internet, etc., and a communication line such as a telephone line, etc.

Also, the above-described program may be transmitted from a computer system storing the program in a storage device, etc., through a transmission medium, or may be transmitted to another computer system by a transmitted wave in the transmission medium. Here, a "transmission medium" for transmitting the program means a medium having an information transmission function such as a network (communication network), for example, the Internet, etc., and the communication line such as a telephone line, etc. Also, the above-described program may achieve part of the above-described functions. Furthermore, the program may achieve the above-described functions by combining with the program that is already recorded in a computer system, that is to say, the program may be a differential file (differential program).

Also, a program product such as a computer-readable recording medium which records the above-described program may be applied to an embodiment of the present invention. The above-described program, recording medium, a transmission medium, and the program product are included in the scope of the present invention. As described above, a detailed description has been given of the embodiments of the present invention with reference to the drawings. However, a specific structure is not limited to the embodiments, and a design, etc., are included within the spirit and scope of the present invention.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A document management method of a print control device connectable via a network to an information processing device that sends an instruction and document to the print control device, the method comprising the steps of:
    detecting a non-native document stored in a detachable memory connected to the print control device, the detachable memory storing native and non-native documents, native documents being printable in the print control device and non-native documents being documents not printable in the print control device; and
    displaying information related to at least one document, including the detected non-native document, on a display of the print control device,
    wherein the stored documents include a plurality of types of non-native documents and a plurality of types of native documents,
    wherein the displayed information related to each non-native document has a first appearance and the displayed information related to each native document has a second appearance different from the first appearance so as to differentiate between non-native and native documents, and
    wherein the first appearance is common to the plurality of non-native document types and the second appearance is common to the plurality of native document types.

2. A document management method according to claim 1, wherein the information related to at least a non-native document is displayed before selection of that document.

3. A document management method according to claim 1 wherein, the information related to each document is displayed after selection of that document.

4. A document management method according to claim 3, further comprising displaying a document icon corresponding to a document stored in the detachable memory and, after selection of that document, displaying the information related to that document in a print icon separate from the document icon.

5. A document management method according to claim 1 wherein the information related to non-native documents and the information related to native documents are displayed together.

6. A document management method according to claim 1 wherein the first appearance differs from the second appearance in a fill effect.

7. A document management method according to claim 1 wherein the first appearance differs from the second appearance in a mark.

8. A document management method according to claim 1 wherein the non-native document has a format that the print control device is not able to interpret.

9. A document management method according to claim 1, further comprising a step of displaying a message on the display, wherein the message is to inform a user of the print control device that the selected non-native document is not available for printing in the print control device.

10. A document management method according to claim 1, further comprising the steps of:
    determining whether a detected non-native document is selected;
    if it is determined that a non-native document has been selected, sending to the information processing device the selected non-native document so as to convert the non-native document into a native document; and
    receiving the converted native document from the information processing device for printing.

11. A document management method according to claim 10, further comprising the step of displaying a message on the display, wherein the message is to inform a user of the print control device that the selected non-native document is not available for printing in the print control device and to confirm if the converting is necessary for printing, in the case that the non-native document is selected on the display.

12. A document management method according to claim 10 wherein the non-native document is converted into a native document comprising a page description language to be interpreted in the print control device.

13. A document management method according to claim 10 wherein the non-native document is converted into a native document comprising a document format to be interpreted in the print control device.

14. A document management method according to claim 10, wherein if the information processing device is unable to convert the non-native document into a native document, the method further comprises the step of sending the non-native document to a second information processing device for conversion.

15. A document management method according to claim 10 further comprising the step of receiving from a user a selection of an information processing device from a plurality of information processing devices, and wherein the selected non-native document is sent to the selected information processing device.

16. A non-transitory computer-readable medium storing document management software to be used in a print control device connectable via a network to an information processing device that sends an instruction and document to the print control device, the software comprising code for causing the print control device to perform the steps of the method according to claim 1.

17. A print control device connectable via a network to an information processing device that sends an instruction and document to the print control device, the print control device comprising a controller for:

detecting a non-native document stored in a detachable memory connected to the print control device, the detachable memory being capable of storing native and non-native documents, native documents being printable in the print control device and non-native documents being documents not printable in the print control device; and displaying information related to at least one document, including the detected non-native document, on a display of the print control device, wherein the stored documents include a plurality of types of non-native documents and a plurality of types of native documents, wherein the displayed information related to each non-native document has a first appearance and the displayed information related to each native document has a second appearance different from said first appearance so as to differentiate between non-native and native documents, and wherein the first appearance is common to the plurality of non-native document types and the second appearance is common to the plurality of native document types.

18. A print control device according to claim 17 wherein the controller is further operable:

to determine if a non-native document is selected, if it is determined that a non-native document has been selected, to send to the information processing device the selected non-native document so as to convert the non-native document into a native document, and receiving the converted native document from the information processing device for printing.

\* \* \* \* \*